No. 622,442. Patented Apr. 4, 1899.
C. M. BROWNELL.
REVOLVING GUARD FOR CYCLE CHAINS.
(Application filed Aug. 6, 1898.)
(No Model.)
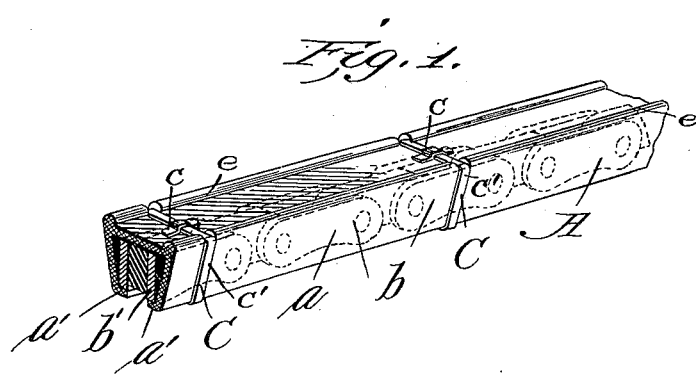
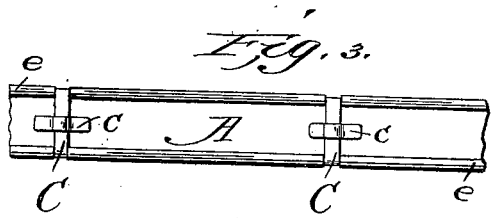
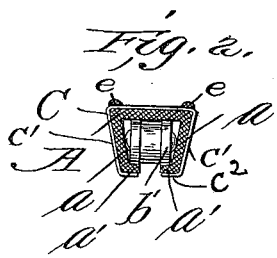
Attest
James M. Shear
Inventor
Clarence M. Brownell
by Walter Donaldson
Attys.
THE NORRIS PETERS CO., PHOTO-LITHO., WASHINGTON, D. C.

UNITED STATES PATENT OFFICE.

CLARENCE M. BROWNELL, OF STROUDSBURG, PENNSYLVANIA.

REVOLVING GUARD FOR CYCLE-CHAINS.

SPECIFICATION forming part of Letters Patent No. 622,442, dated April 4, 1899.

Application filed August 6, 1898. Serial No. 687,941. (No model.)

*To all whom it may concern:*

Be it known that I, CLARENCE M. BROWNELL, a citizen of the United States, residing at Stroudsburg, Monroe county, Pennsylvania, have invented certain new and useful Improvements in Revolving Guards for Cycle-Chains, of which the following is a specification.

My present invention relates to improvements in chain-guards for the chains of bicycles of that class in which an endless guard, preferably of rubber, is used, which incloses the chain on three sides and travels with it. I have found that in the use of such guards there is a tendency of the chain to jump out of the channel owing to the necessary slackness of the chain and the elasticity of the rubber, the lateral vibration of the chain causing the endless guard to be thrown off at some point and in the forward movement of the chain to be run entirely off of the same. As in guards of this nature the guard not only travels with the chain, but has a tendency to travel faster than the chain, rigid connections cannot be provided, as they would tend to interfere with the free movement of the parts.

It is the object of the present invention to provide a connection which while effectually preventing the guard from jumping or running off or free from the chain will yet permit it to move longitudinally thereof.

The invention is illustrated in the accompanying drawings, in which—

Figure 1 is a perspective view of a portion of an endless guard. Fig. 2 is a cross-section showing a modified way of fastening the clip, and Fig. 3 is a plan view of Fig. 1.

In the figures, A represents the guard, which consists of a channel strip of rubber molded to the desired shape, having side portions $a$, which embrace the sides of the chain (indicated at $b$) and are provided at their edges with inwardly-turned lips or flanges $a'$, corresponding approximately in width to the thickness of the side links $b'$ of the chain.

The fastening or connecting means for holding the guard upon the chain comprises a series of spring-metal clips of the shape of the guard in cross-section, as shown at C. These clips are made of about three-eighths of an inch in width and are placed about six inches apart upon or about said guard, being held in position by strips of rubber $c$, extending across the clip. The side members $c'$ of the clips extend down on each side of the guard and have lips or projections $c^2$ on their ends, which extend inward to correspond to the lips on the guard and insure the holding of the guard to the chain. It will thus be seen that the guard being flexible and to a certain degree elastic will fit closely upon the chain and travel therewith and will be effectually held against any accidental transverse displacement, while at the same time longitudinal movement of the guard upon the chain is not interfered with.

Owing to the spring material of which the clips are made they may be readily disengaged when it is desired to remove the guard.

I prefer to form the guard with raised ridges $e$ at the upper corners running the entire length of the guard, and instead of using rubber strips for securing the clips I may slit these ridges at their bases and pass the clips through the slits, as shown in Fig. 2.

The ridges I find to add to the effectiveness of the guard in using a bicycle provided with the guard in rain-storms, the channel formed by the ridges keeping water from dripping over the sides and into the chain at its lowest point.

The water would come in contact with the forward sprocket at the point where the chain and sprocket-teeth engage and then be deposited in the lower half of the chain and guard, this being now obviated by running the water off as the guard goes over the sprockets.

In order to counteract the tendency of the side walls of the guard to pucker or wrinkle when bending in passing around the sprocket-wheels and to thus insure the contact of the inwardly-turned flanges with the sprocket-wheel at all points, I find it desirable to incline these side walls inward, so that it is dovetailed in cross-section. By this construction any tendency to pucker or wrinkle outward is removed and the tendency to pucker inward is met by the sprocket-wheel, thus insuring a close joint between the sprocket-wheel and guard.

Having thus described my invention, what I claim is—

1. In combination, the chain, the flexible guard-strip moving therewith and having a channeled outer face acting to shed the water substantially as described.

2. In combination, the chain, the flexible guard-strip moving therewith and having ribs or ridges at its outer corners, substantially as described.

3. In combination, the chain, the flexible guard-strip moving therewith and having ribs or ridges at its outer corners and the spring-clips passing through slits in said ridges and connecting the guard with the chain, substantially as described.

4. A guard for a cycle-chain comprising a flexible strip having a dovetailed channel, substantially as described.

In testimony whereof I affix my signature in presence of two witnesses.

CLARENCE M. BROWNELL.

Witnesses:
ROBT. GRUVER,
M. E. MILLER.